United States Patent Office 3,053,663
Patented Sept. 11, 1962

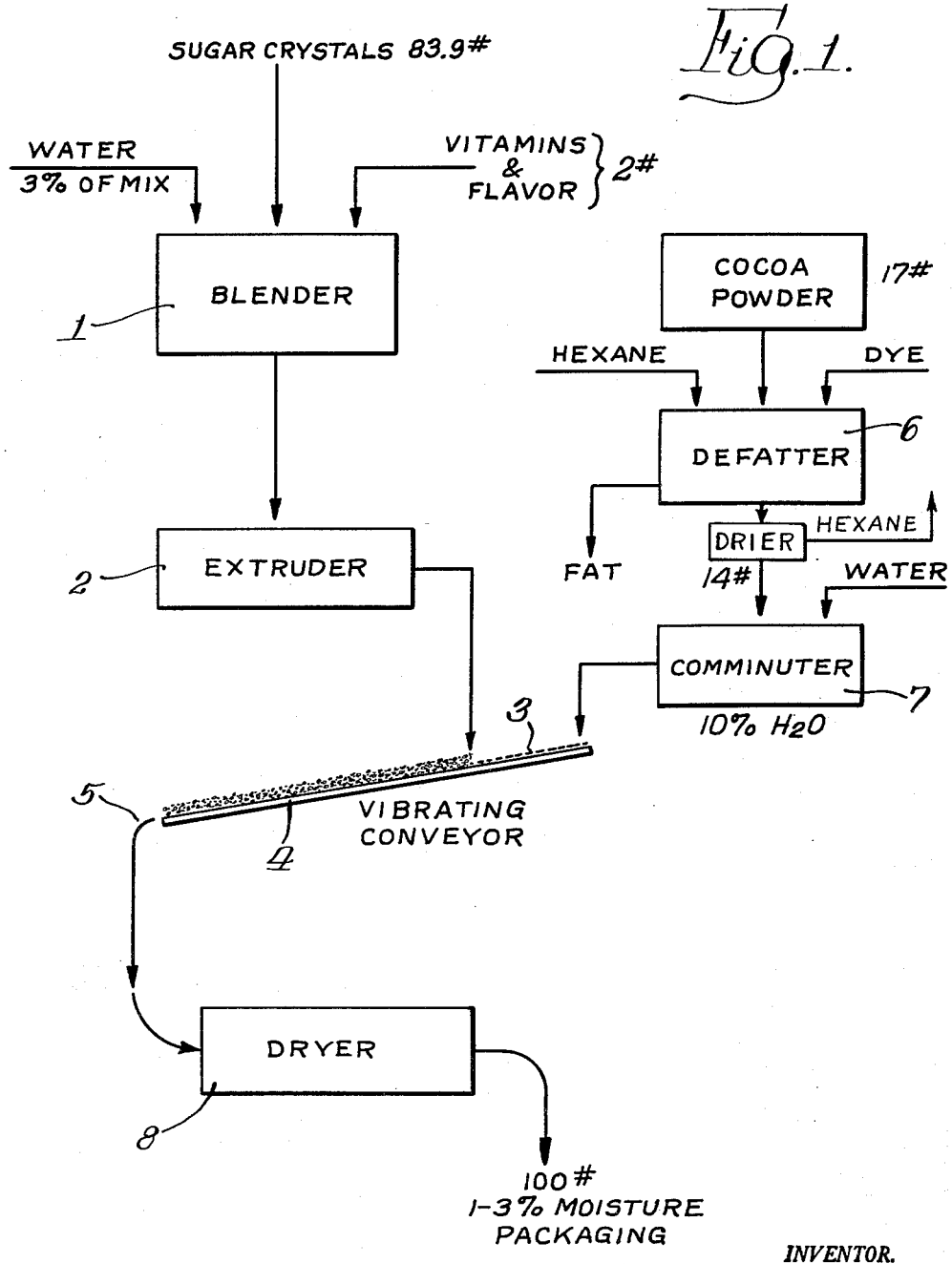

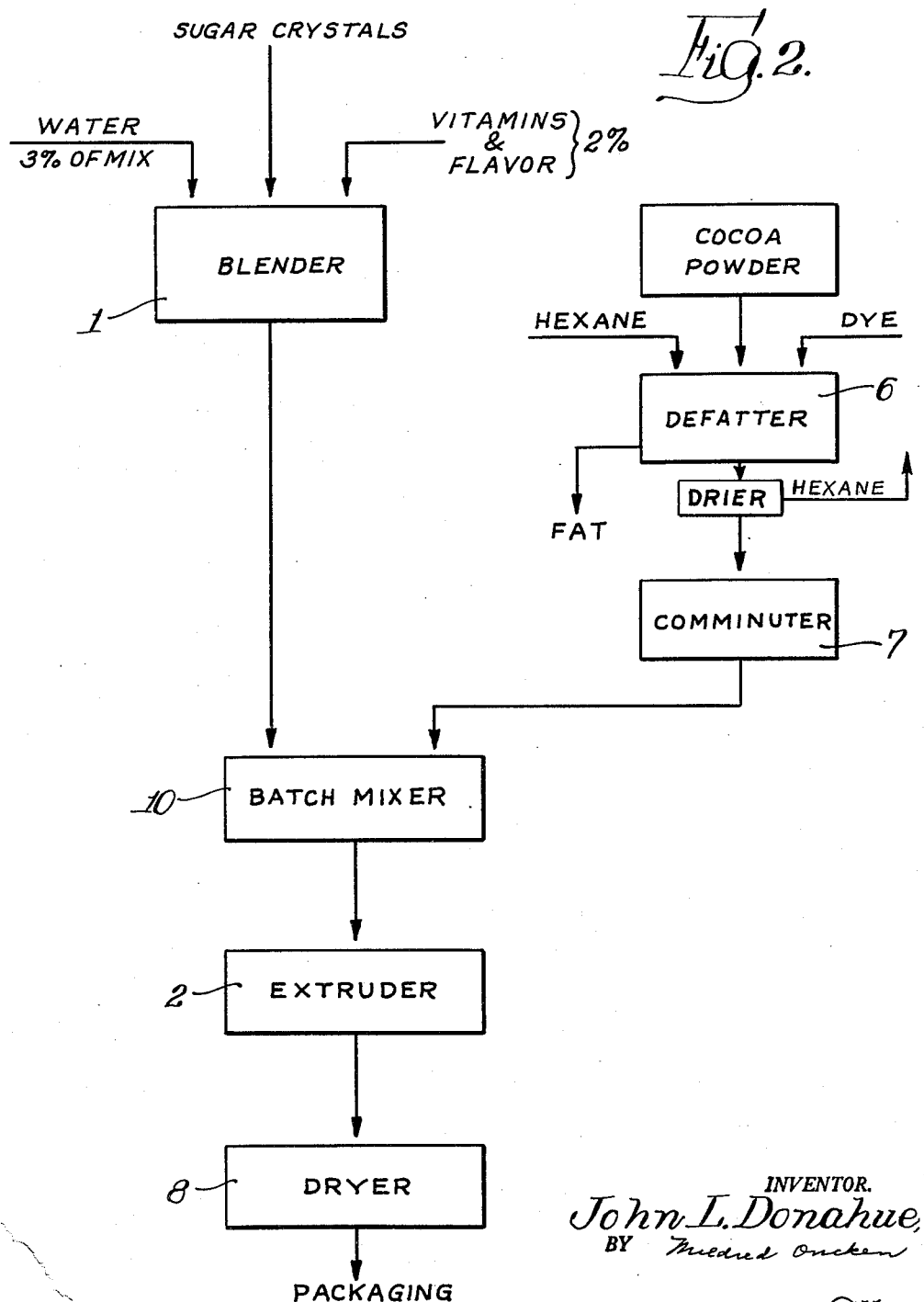

3,053,663
CHOCOLATE DRINK BASE AND METHOD
John L. Donahue, Chicago, Ill., assignor to Corn Products Company, New York, N.Y., a corporation of Delaware
Filed Nov. 24, 1959, Ser. No. 855,101
15 Claims. (Cl. 99—26)

The present invention relates to a dry cocoa-sugar base intended for use with hot or cold milk to make a chocolate beverage, and to the method of producing said base.

Known forms of dry chocolate drink base are subject to one or more of the following disadvantages:

(a) The product is slow to sink below the surface of the milk, that is, it resists wetting by the liquid medium.

(b) It is hard to disperse the product in milk by stirring normally with a spoon.

(c) The particles of the product tend to lump and floc together when added to milk.

(d) Certain components of the product are subject to excessive settling-out after being mixed with milk.

(e) Certain components of the product are subject to excessive floating on the surface of the milk after being mixed with milk.

(f) The product itself is non-free flowing.

The chief object of the present invention is to provide a novel product comprising agglomerates of sugar crystals carrying dry cocoa in finely divided form, which product may be added to or mixed with hot or cold milk or similar aqueous liquid, whereupon the sugar crystals will be dissolved, and the cocoa dispersed in the liquid by stirring the mixture with a spoon.

A further object is to provide a novel method of preparing said product.

A further object is the production of a chocolate milk or similar beverage of improved character utilizing said novel product.

The product of this invention avoids the aforesaid disadvantages by virtue of its novel physical form and composition, and its resultant behavior upon being put to use.

According to the preferred practice of the present invention, commercial cocoa powder is first defatted as by hexane extraction. The remaining hexane is removed in a dryer. The powder is then ground or otherwise comminuted, its moisture content being raised at this stage to a value of about 10% by weight. This moisture content serves to slow down the take-up of liquid when the product is contacted by the liquid to which it is added. Thereby lumping is avoided. Dry cocoa powder, i.e., with substantially no moisture, tends to take up so much moisture from the moist sugar crystals which serve as carrier for the cocoa powder that the exposed surfaces of the sugar crystals become too dry to enable enough particles of the powder to adhere thereto. In comminuted form, and with the predetermined moisture content aforesaid, the cocoa powder is combined with a sugar base carrier. This sugar base carrier is produced from dry sugar crystals by adding to them and stirring in about 3% moisture, which makes them sticky. The moistened sugar crystals are extruded in the form of short vermicular bodies. The cocoa powder, prepared as aforesaid, is to be combined with the carrier, either before extrusion or thereafter. If the sugar crystals and cocoa are to be brought together before extrusion, then the cocoa powder prepared as aforesaid, except that moisture addition may be omitted, is mixed with a batch of moistened sugar crystals before extrusion.

Where combination of the cocoa powder with the carrier is to be effected subsequent to extrusion, the short vermicular sugar bodies, while still moist and sticky, are brought into contact with the cocoa powder, and stirred or rolled in the same, to provide an external coating of said powder. In either method of preparation, the granules or vermicular bodies are generally cylindrical in shape, and may be, for example, of approximately $\frac{1}{16}$ inch diameter by $\frac{1}{8}$ inch in length, as average dimensions. The dimensions are not critical. It is desirable to have the carrier in the form of crisp, porous granules of high superficial surface area relative to volumetric content. These bodies are free of fines. They are dense enough when wetted to sink in milk or other aqueous liquids, and the sugar tends to dissolve and the cocoa to disperse in hot or cold milk quite rapidly with no more than stirring with a spoon.

It is well known that when a limited amount of moisture is applied to sugar crystals it does not penetrate the solid crystals but tends to form a solution on the surface of the crystals. This solution will tend to concentrate in capillary spaces as at the points where the sharp cornered crystals are in contact with each other. As the moisture dries out, the sugar in the solution tends to re-crystallize and unite to form a solid bridge between the adjacent contacting parts of the crystals. This action, in the case of sugar, is frequently referred to as "caking." The connecting crystalline sugar material may be regarded as an autogenous cement or adhesive. When cocoa powder is added this adhesive or cement, while still moist, tends to bond the particles of powder to the crystals without producing a tendency on the part of the cocoa particles to agglomerate. When the finished composition is put into a charge of milk or similar aqueous liquid, the adhesive or cement which holds the sugar crystals to each other, and which causes the cocoa powder to stick to said sugar crystals, is dissolved. Thereupon the cocoa particles are released in thoroughly wetted and dispersed condition, so that they do not either rise or fall in the liquid or tend to agglomerate. The dispersibility of the finely divided cocoa powder, without forming flocs depends upon its wettability. This in turn is controlled or strongly influenced by the defatting of the cocoa above referred to. The carrier body of cemented sugar crystals is highly porous, and liquid is admitted to the cemented regions for rapid release of the crystals and of the cocoa powder.

The cocoa charged composition of the present invention is free flowing and tends when introduced into the charge of liquid to sink rapidly below the surface of the liquid charge. Stirring the mixture with a spoon will cause dispersal of the particles of cocoa with no observable tendency of the particles to lump or floc together. Once the particles of cocoa are dispersed in the milk, they have a minimum tendency to sink or settle, and no tendency to float on the surface.

The cocoa-sugar product of this invention may be used for other purposes, such as topping for cakes, etc.

In order to acquaint those skilled in the art with the manner of practicing the present invention, I shall describe, in connection with the accompanying drawings, a specific embodiment thereof.

In the accompanying drawings:

FIGURE 1 is a flow chart and diagram of the preparation of the chocolate drink base according to one embodiment of the invention, wherein the cocoa powder is added to the moist sugar crystals after they are formed by extrusion into vermicular bodies.

FIGURE 2 is a like diagram of the preparation of the chocolate drink base of my invention, wherein the cocoa powder is added to the moist sugar crystals before the latter are formed by extrusion into vermicular bodies.

Referring first to the diagram of FIGURE 1, there is indicated the production of 100 pounds of the product containing substantially 14% of cocoa.

Granular sugar—baker's special, fine granulated grade—in the amount of 83.9 pounds is mixed with two pounds of a vitamin and flavor pre-mix in a standard type ribbon blender 1. While these materials are being mixed, water is sprayed into the blender to bring the moisture content of the mix to about 3%.

The moistened sugar is formed into bodies or agglomerates in an extruder 2 by forcing the moistened sugar crystals through apertures in a perforated plate. Such apertures may, for example, be 1/16 inch in diameter with resultant bodies of approximately the same diameter. The extrusion produces vermicular streams or bodies of extruded material, which consists of crystals stuck together by saturated sugar solution which tends to form at the points of contact of the crystals with each other. This saturated solution at the contacting points constitutes an autogenous cement or adhesive, which, when dried, forms an integral part of the adjacent crystals without filling in the interstices between the bodies of the crystals. The vermicular extrusion which breaks up or is broken up into short lengths produces small porous bodies which are approximately cylindrical in form. Preferably, they are of approximately 1/16 inch in diameter by 1/8 inch in length as the average dimensions.

The amount of moisture added to the initial sugar crystals should be great enough to produce the agglomeration of the crystals on extrusion. About 3% of moisture (based on the weight of the final product) will serve to produce satisfactory agglomerates. The higher the percentage of water added (within the limits of operability) the more saturated sugar solution will be formed and the denser and less porous will be the extruded agglomerates. The density of the particles is less than that of the liquid. Sinking of the particles in the liquid is due to a rapid wetting which occurs as soon as the particles contact the liquid. The sugar employed is preferably baker's special fine granulated sugar.

The density of the agglomerates varies with the thickness of the perforated plate which is employed in the extruder 2. The agglomerates, while still moist and sticky, are contacted with defatted cocoa powder of a predetermined moisture content. Bringing the agglomerates into contact with the defatted cocoa powder is done in this case by discharging the vermicular bodies or agglomerates directly onto a layer 3 of defatted cocoa disposed on a vibrating conveyor 4, which mixes and agitates the moist vermicular sugar agglomerates with the defatted cocoa powder and at the same time conveys the same to a suitable delivery point 5.

The cocoa employed in coating these bodies must be substantially devoid of fat to perform satisfactorily according to the present invention and in this specific example, 17 pounds of commercial medium fat cocoa has been so prepared by hexane extraction. The commercial cocoa powder is subjected to contact with the hexane in the defatting apparatus indicated at 6, and at the same time, if desired, artificial dye of food grade may be added to the cocoa by dispersing an aqueous dye solution in the hexane cocoa slurry, thereby providing a uniformly colored cocoa.

When the fat content of the cocoa has been reduced in the defatting apparatus 6 to about 1% or less, the residual hexane is removed from the cocoa in a dryer, and the cocoa delivered to the comminuter. While the cocoa is undergoing comminution, water is added to bring the moisture content of the cocoa to about 10%. From the comminuter 7, where it has been reduced uniformly to fine powder, the cocoa powder is delivered at a predetermined rate onto the deck of the vibrating conveyor 4 where it forms a thin layer available to receive and adhere to the agglomerated sugar bodies discharged from the extruder. The vibrating conveyor 4 rolls the sugar agglomerates in the cocoa powder, resulting in complete coating of the sugar agglomerates, and the attachment of powder particles to the sugar agglomerates and to each other by the cementing action of the saturated sugar solution. From the discharge point of the conveyor 4, the coated agglomerates are conveyed to a dryer 8 where the agglomerates are dried to a moisture content of from 1% to 3%. They include about 14% cocoa.

It is to be understood that the weights of the ingredients may be varied, so as to vary the amount of cocoa in the final product to that which may be desired. Also, it is to be understood that within the invention, a non-defatted cocoa may be used, but its use requires the addition of a wetting agent to the product to give it satisfactory properties, particularly that of dispersion in an aqueous liquid medium.

The moisture content of the sugar at the time of coating, which may vary from 1.5 to 7%, and the moisture content of the cocoa, which should not depart far from the 10% figure above referred to, can be varied, but the proportions given in the above example are preferred.

The ratio of cocoa to sugar may be controlled in one or more of several ways. Reducing the diameter of the extrusion orifices increases the ratio of surface area to volume of the agglomerates. This tends to raise the proportion of adhering material in the product. Increasing the length of the extrusion orifice tends to increase the density of the extruded sugar agglomerates, and hence tends to reduce the proportion of adhering material in the product.

The preferred density of the finished material is approximately 34 to 39 pounds per cubic foot. The cocoa carrying bodies produced in accordance with this invention may be used not only for making a chocolate beverage, but may also be used as topping for ice cream, cakes and on or with cereals and so forth. A variety of additional flavoring materials may optionally be employed by embodying the same in or adding them to the moisture initially applied to the sugar crystals.

Referring now to the modified product and to the process illustrated in FIGURE 2, the sugar crystals may optionally have a small amount of vitamins and/or flavor mixed therewith in the blender 1. At this point, water to the amount of approximately 3% of the mix is added to moisten the sugar crystals. The moistened crystals are then delivered to the batch mixer 10. To this batch mixer is brought the defatted cocoa powder prepared substantially as in the method of FIGURE 1. The cocoa powder in this case is defatted in the defatting operation indicated at 6, where hexane is employed to extract the fat from commercial medium fat cocoa as the preferred feed material. During the defatting operation a suitable dye may optionally be added, as in the previously described process, to control the color of the product. After the cocoa is defatted with hexane at defatter 6 it is passed through the dryer to remove any remaining hexane. The defatted and dried cocoa is then delivered to the comminuter 7. The cocoa then contains a maximum of 1% of fat. Its normal moisture level is about 7% to 8% when it is delivered from the comminuter 7. No addition of moisture at this stage is required. The cocoa can be milled with the moisture content thereof as per the above value, and the final product will be free from objectionable floc of the cocoa powder.

Higher moisture levels in the cocoa followed by milling result in an inferior chocolate flavor, and the powdered cocoa tends to floc when the product is introduced into the liquid with which it is to be combined. The milled or comminuted cocoa from the comminuter 7 is delivered to the batch mixer 10 along with the moist sugar crystals in the proportion of approximately 14% cocoa in the final product. From the batch mixer 10, where the cocoa and moistened sugar crystals are thoroughly blended or mixed, the product, still in moist form, is delivered to the extruder 2 where it is extruded through an orifice or orifices or similarly formed into small porous vermicular bodies or granules of loosely compacted crystals of sugar incorporating cocoa powder. These particles or agglomerates are then dried and delivered to a packaging station. They should contain about 1% to 3% moisture when so delivered. The product is free flowing, porous, granular material of fine, friable agglomerates, substantially free of fines. In either form of the final product the defatted cocoa powder may be present in the proportion of about 10% to 20% by weight according to the requirements of the customer.

The details of preparation of my novel product and the proportions of ingredients are subject to variation without departure from the invention as defined in the appended claims, which set forth the true scope of the invention. The caution is to be observed, however, that a large amount of water cannot be added directly to the cocoa or to a sugar-cocoa mixture prior to extrusion without permanently destroying the dispersibility of the cocoa in milk and reducing the chocolate flavor of the drink. It is believed that both faults are due to the agglomeration of cocoa particles.

I claim:

1. Method of making a chocolate flavored drink base which comprises defatting commercial cocoa powder by solvent extraction to reduce the fat content to not more than about 1%, comminuting said defatted cocoa powder, moistening dry sugar crystals with water to develop stickiness of the crystals, extruding the moistened sugar crystals through an orifice to form vermiculate agglomerates of predetermined and substantially uniform size and contacting said crystals of said agglomerates with said defatted cocoa powder to constitute the agglomerates as carriers of said cocoa powder.

2. The process of claim 1 wherein the cocoa powder is added to the moistened crystals and mixed therewith before said crystals are extruded to form said vermiculate agglomerates.

3. The process of claim 1 wherein the cocoa powder is added to the moistened crystals after the same are extruded to form said vermiculate agglomerates.

4. Method of making a chocolate flavored drink base which comprises wetting the surfaces of a mass of sugar crystals with water whereby they become sticky, contacting the sticky surfaces of the crystals with defatted cocoa powder having a fat content of not more than about 1½% whereby the particles of cocoa powder adhere to the sugar crystals, and drying the mass of crystals with adhering powder particles whereby a dry porous mass is produced.

5. Method of making a dry base for a flavored drink which comprises moistening sugar crystals with an aqueous medium to produce a sticky sugar solution on said crystals, compressing a mass of said crystals and extruding the mass through a die opening to produce a vermicular stream of issuing material, breaking the stream into relatively short lengths to produce substantially cylindrical agglomerates of predetermined size, drying the said agglomerates and contacting the surfaces of the agglomerates while still moist with loose flavoring material in powder form before the same are dried whereby the particles of said powder adhere to said crystals of said agglomerates.

6. Method of making a base for a chocolate drink which comprises wetting the surface of a mass of sugar crystals whereby they become sticky, forming the wetted crystals into vermicular agglomerates of predetermined size, dropping said agglomerates upon a layer of finely divided defatted cocoa, vibrating said layer and said agglomerates whereby the agglomerates become coated with said cocoa, and drying said coated agglomerates.

7. The method of making a dry base for a flavored drink which comprises mixing a dry pulverulent chocolate flavor bearing material with sugar crystals having their surfaces moist with an aqueous medium, compressing a mass of said mixture and extruding the same through a die to produce an agglomerate vermicular stream, breaking the stream into short lengths to produce granular agglomerates of predetermined size and shape, and drying said agglomerates.

8. The method of claim 4 further characterized by the sticky sugar crystals being shaped into small substantially cylindrical agglomerates before being contacted by the particles of cocoa powder.

9. The method of claim 6 further characterized by the sticky sugar crystals and the particles of cocoa powder being shaped into small substantially cylindrical agglomerates.

10. Method of making a base for a chocolate drink which comprises wetting the surface of a mass of sugar crystals with water whereby they become sticky, forming said sticky crystals into agglomerated carrier bodies, contacting said bodies of predetermined size with defatted cocoa powder and drying the bodies with adherent powder.

11. Method of making a base for a chocolate drink which comprises mixing a mass of granulated sugar with a flavor pre-mix, wetting the mass to bring the moisture content of the mix to about 3%, extruding the moistened mass through a die of approximately 1/16 inch diameter to provide an agglomerate of predetermined thickness, contacting the extruded material with defatted cocoa in powder form, agitating the moist extruded sugar particles and the cocoa whereby the cocoa adheres to the sugar particles, and then drying the resultant product to a moisture content of approximately 1 to 3%.

12. Method of making a chocolate flavored drink base which comprises forming wet sugar crystals into agglomerates of predetermined and substantially uniform size and contacting the agglomerates while sticky with defatted cocoa powder whereby the particles of cocoa powder adhere to the sugar crystals, and drying the agglomerates with the adhering cocoa particles whereby a dry porous agglomerate of sugar crystals coated with cocoa particles is produced.

13. Method of making a chocolate flavored drink base which comprises forming wet sugar crystals into agglomerates of predetermined and substantially uniform size, agitating the agglomerates while sticky together with defatted cocoa powder without altering the size of the agglomerates and thereby coating the agglomerates with the particles of cocoa adhering to the sugar crystals of the agglomerates, and drying the coated agglomerates with adhering cocoa particles thereby producing a dry porous mass of cocoa coated agglomerates of sugar crystals.

14. A cocoa-sugar product comprising a mass of short cylindrical particles, each of said particles consisting essentially of a vermiculate core of agglomerated sugar crystals bonded together by autogenous cementation and a charge of cocoa having a fat content of not more than about 1% adhering to said crystals and carried thereby, said cocoa being present in the proportion of about 10 to 20% of the entire mass.

15. A cocoa-sugar product according to claim 14 wherein said cocoa is present in the proportion of about 14% of the entire mass.

References Cited in the file of this patent

UNITED STATES PATENTS

| | | |
|---|---|---|
| 2,077,819 | Zizinia | Apr. 20, 1937 |
| 2,179,130 | Middletown | Nov. 7, 1939 |
| 2,299,288 | Whymper | Oct. 20, 1942 |
| 2,439,384 | Fitzer | Apr. 13, 1948 |
| 2,452,770 | Lang | Nov. 2, 1948 |
| 2,850,388 | Peebles et al. | Sept. 2, 1958 |
| 3,006,763 | Marcy et al. | Oct. 31, 1961 |

OTHER REFERENCES

Jacobs: "The Chemistry and Technology of Food and Food Products," 2nd ed., vol. 3, 1951, Interscience Publishers, N.Y., page 2161.

UNITED STATES PATENT OFFICE
CERTIFICATE OF CORRECTION

Patent No. 3,053,663                                September 11, 1962

John L. Donahue

It is hereby certified that error appears in the above numbered patent requiring correction and that the said Letters Patent should read as corrected below.

Column 2, line 22, for "thecrystals" read -- the crystals --; column 6, line 16, strike out "of predetermined size" and insert the same after "bodies" in line 15, same column 6.

Signed and sealed this 12th day of February 1963.

(SEAL)
Attest:

ERNEST W. SWIDER                                DAVID L. LADD
Attesting Officer                                   Commissioner of Patents